United States Patent

Obloh et al.

Patent Number: 5,418,264
Date of Patent: May 23, 1995

[54] AN AQUEOUS COATING AGENT AND USE THEREOF

[75] Inventors: Ronald Obloh, Dortmund; Heinrich Schwan, Wuppertal, both of Germany

[73] Assignee: Herberts GmbH, Wuppertal, Germany

[21] Appl. No.: 205,815

[22] Filed: Mar. 3, 1994

Related U.S. Application Data

[63] Continuation of Ser. No. 48,552, Apr. 16, 1993, abandoned, which is a continuation of Ser. No. 914,714, Jul. 16, 1992, abandoned.

[30] Foreign Application Priority Data

Jul. 18, 1991 [DE] Germany ............... 41 23 860.5

[51] Int. Cl.$^6$ ............................................... C08L 63/00
[52] U.S. Cl. ................................. 523/414; 523/401; 523/402; 523/415; 528/422
[58] Field of Search ............... 528/422; 523/415, 401, 523/402, 414

[56] References Cited

U.S. PATENT DOCUMENTS 4,925,885  5/1990  Rosthauser .................. 523/415
4,987,163  1/1991  Becker et al. ................ 523/402

FOREIGN PATENT DOCUMENTS 0319841  6/1989  European Pat. Off. .
2127829  4/1984  United Kingdom ......... 523/415

*Primary Examiner*—John Kight, III
*Assistant Examiner*—John M. Cooney, Jr.
*Attorney, Agent, or Firm*—Richard A. Speer; Keck, Mahin & Cate

[57] ABSTRACT

An aqueous coating agent, containing one or more film-forming water-dilutable or water-soluble epoxy resins with an epoxide equivalent weight of 100 to 10000, one or more water-dilutable or water-soluble polyamines with at least two primary and/or secondary amino groups in the molecule and an equivalent weight of 50 to 500, and optional pigments, fillers and/or other conventional lacquer adjuvants, the ratio of reactive H atoms in the polyamines to the epoxy groups in the epoxy resins being 0.7:1 to 1.5:1 and 5 to 80 wt. % of one or more water-dilutable or water-soluble polyurethane resins with a number average molecular weight (Mn) of 500 to 500000 relative to the sum of the weights of the solids in the epoxy resin and polyamine.

14 Claims, No Drawings

AQUEOUS COATING AGENT AND USE THEREOF

This is a continuation of application Ser. No. 08/048,552, filed on Apr. 16, 1993, now abandoned the text of which is hereby incorporated by reference, which is in turn a continuation of application Ser. No. 07/914,714, filed on Jul. 16, 1992, now abandoned.

The invention relates to an aqueous coating-agent composition suitable for producing coatings without surface faults. It can be in two components (German abbreviation 2K) or one component (1K). It is particularly suitable for producing primers for multi-layer lacquering.

BACKGROUND OF THE INVENTION

Two-component epoxy resin systems on a water-dilutable basis are known in the industry. They are used e.g. for prevention of corrosion. The properties of the coating agent can be influenced via the choice of epoxy resin or the choice of the amine cross-linking agent. The general principles of this method are described in the article by C. Godau in I-Lack 4.90, Volume 58, page 134. The advantages are said to be good elasticity and good adhesion of the wet film. The article refers to the difficulties of efficient film formation, which depends on the drying conditions and the pot life of the resin mixture. It is also stated that the stability of the dispersion is adversely influenced e.g. by pigments with a high content of salt-forming, i.e. ionic, substances.

EP-A 0 176 192 describes a two or three-component material consisting of an epoxy resin, a polymer produced by radical polymerisation of olefinically unsaturated monomers, and a binder containing groups which react with epoxy groups. Aqueous dispersions are produced via hydrophilic groups or by using emulsifiers.

DE-OS 38 25 754 describes two-component epoxy-amine systems which can be diluted with water. The water content is below 20%, and consequently the coating agent cannot be described as aqueous. The cross-linking components mentioned are aliphatic di-primary diamines containing 2 to 12 carbon atoms. The film-forming constituents are stated to be polyglycidyl compounds based on bisphenols or polyols, together with a binder based on OH-containing polyacrylates or polyethers. A disadvantage of these coating agents is that the properties of the film are impaired when the water content rises. Compositions of this kind are not particularly suitable as regards protection of the environment.

EP-A 0 319 841 describes two-component aqueous epoxy-amine coating agents. One component consists of an aqueous dispersion of epoxy resins whereas the other component consists of a special urethane oligomer with terminal amino-functional groups, between 25 and 40% of which are neutralised with acid. Up to 20% of organic solvents are also added, to obtain a sufficiently level film. Special process steps are disclosed for manufacturing the amino functional polyurethane oligomer.

One general difficulty of the known conventional 2-K aqueous coating agents based on epoxy resin and polyamine is that the aqueous solutions must be stable. When ionic groups are used, the stability of the aqueous dispersion mixture is often unsatisfactory. Another disadvantage of coating agents based on ionic dispersions is that the resulting surfaces are non-uniform, e.g. with pin holes after liquefying. In addition, the known 2K epoxy-amine coating agents are unsuitable for plastics lacquering, since they are too inelastic after crosslinking.

The aim of the invention is to provide aqueous epoxy-amine coating agents which are stable individually or in individual components and yield stable dispersions when mixed and produce smooth, fault-free surfaces after application. Another aim is to obtain coatings with good adhesion to the substrate and subsequent layers with high elasticity.

To this end, the coating agent comprises an aqueous epoxy resin-containing film-forming binder and a cross-linking component based on an aqueous or water-dilutable polyamine, and either the epoxy resin component or the polyamine component or both components together contain 5 to 80 wt. %, relative to the total epoxy resin and polyamine, each considered as resin solids, of a polyurethane resin in water-soluble or water-dispersible form. The aqueous polyurethane resin contains substantially no reactive groups used for crosslinking; it can be stabilised by ionic or non-ionic substances. The coating agent can also contain pigments, fillers and/or other conventional additives in the lacquer industry.

According to the invention, water-dilutable binders and crosslinking agents are used. "Water-dilutable" means convertible into an aqueous form, either a dispersion, emulsion or molecular dissolved form. The solvent in the coating agent is mainly water.

The binder components in the coating agents according to the invention can be conventional di- or polyepoxides. These binder components are film-forming epoxy resins in the form of an aqueous dispersion or water-dilutable resin. The polyepoxides can e.g. be polyglycidyl ethers based on aliphatic or aromatic diols, such as bisphenol A, bisphenol F, novolaks or polyalkylene glycols which are commercially available and well-known to the skilled addressee.

SUMMARY OF THE INVENTION

The polyepoxide compounds may also be reaction products of aromatic diphenols with aromatic polycarboxylic acids, e.g. phthalic or terephthalic acid or trimellitic acid, to form polyesters. These are reacted e.g. with 2,3-epoxy-1-propanol to form the epoxy compounds.

Glycidyl-functionalised (meth)acrylic polymers are other examples. Glycidyl functional monomers can be incorporated by polymerisation, e.g. glycidyl(meth)acrylate or 1,2-epoxybutyl acrylate, or OH-containing (meth)acrylates can be modified by compounds containing epoxy groups, via the OH group after polymerisation. The properties of the polymers can be influenced via other comonomers.

The term "(meth)acrylic" here means acrylic and/or methacrylic.

Examples of aqueous epoxy resin dispersions are described in DE-OS 36 43 751 and DE-OS 38 20 301. They are modified epoxy resins based on aromatic diols which yield stable aqueous solutions.

The epoxy resin has an epoxide equivalent weight of 100 to 10000. The number average molecular weight (Mn) of the epoxy resin is preferably between 400 and 50000, preferably 500 to 10000 in the case of polyether epoxides and polyester epoxides, and 2000–10000 in the case of (meth)acrylate epoxy resins. The polyepoxy resins preferably contain about 2 or more epoxy groups per molecule. Epoxy resins have a structure such that they are dilutable, e.g. soluble, in water. This can be brought about either by incorporating hydrophilic groups, e.g. polyether structures or polyol structures, by a reaction, or the epoxy resins are converted into the aqueous phase by using ionic or non-ionic emulsifiers. Polyepoxides based on aromatic hydroxyl compounds are preferred. It is also preferred to use aqueous epoxy resin dispersions.

The polyamine components can e.g. be those already described in the literature for two-component epoxide/amine systems. They contain reactive amino groups and optional other functional groups for increasing the solubility in water. Suitable polyamine components, suited as crosslinking agents, can have film-forming properties.

The equivalent weight per active H atom is about 50 to 500, preferably about 100 to 300. The molecular weight is not subject to any restriction, provided the substance is dilutable in water and reactive. The number average molecular weight (Mn) is preferably at least 100, e.g. 200 to 10000.

The amine component must be chosen so as to be dilutable or soluble in water. This can be done by choosing polar groups such as OH or amino or urea groups or polyether structures. The crosslinking components can either be in the form of an aqueous dispersion or in concentrated form and diluted with water during processing. Aliphatic-based polyamines are preferred.

The polyamines may e.g. be diamines or amines with more than two amino groups, the amino groups being primary and/or secondary. The polyamines may also be adducts consisting of polyamines with at least two primary amino groups and modifiable via other functional groups, e.g. with epoxy compounds or polyisocyanates or with (meth)acryloyl compounds. The polyamines may also be polymers into which the amino-functional groups are subsequently introduced by a reaction.

Examples of suitable polyamines are described in EP-A-0 240 083 or EP-A-0 346 982. The following are examples: aliphatic and/or cycloaliphatic amines with 2–24 carbon atoms containing 2–10 primary amino groups and 0–5 secondary amino groups. The following are representative examples: hexamethylene diamine, 1,2-diaminocyclohexane, isophorone diamine, diethylene triamine or polyether polyamines.

The conventional polyamines based on modified polyfunctional amine components with di- or polyfunctional epoxy compounds may e.g. be substances produced by using e.g. diglycidyl or polyglycidyl ethers based on bisphenol A or bisphenol F, polyglycidyl ethers of phenol formaldehyde or novolaks, or glycidyl ethers of fatty acids with 6–24 carbon atoms or epoxidised polybutadienes or resins containing glycidyl groups, e.g. polyesters or polyurethanes containing one or more glycidyl groups per molecule.

Alternatively use can be made of polyamidoamines as described e.g. in EP-A-0 262 720. These are reaction products of mono- or polycarboxylic acids with polyamines containing primary amino groups.

Polyamine isocyanate adducts can also be used. The isocyanates can be aliphatic, cycloaliphatic and/or aromatic di- or polyisocyanates conventional in the lacquer sector. The isocyanates are reacted with polyamines e.g. at a temperature range of 20° to 80° C., optionally with addition of small quantities of a catalyst. The polyamines are added in a quantity such that a sufficient number are present after the reaction.

Examples of acryloyl-unsaturated compounds for producing polyamine adducts are described in U.S. Pat. No. 4,303,563. The acryloyl N-groups of the polyacrylic oligomers can be reacted with polyamines. The addition reaction is preferably brought about at elevated temperature. The resulting products may also contain olefinically unsaturated functional groups.

Other methods of synthesising activators containing amine groups are described in EP-A-0 002 801 and EP-A-0 179 954. These substances are copolymers based on (meth)acrylic acid derivatives which are reacted and functionalised with diamines or alkylene imines.

The polyurethane resin components can be commercial aqueous polyurethane dispersions. The polyurethane binders are not crosslinked. They usually do not contain any other reactive groups necessary for crosslinking with the epoxy amine system. The polyurethane binders can be made soluble or dilutable in water by using emulsifiers or by incorporating ionic groups or non-ionic hydrophilic groups by a reaction. Preferably the polyurethane binders contain anionic components, e.g. acid groups, e.g. carboxylic groups or sulphonic acid groups for conversion into the aqueous phase after neutralising with bases such as ammonia or amines. The bases for neutralising can also be the polyamines used as crosslinking agents. The polyurethane binders can be chemically modified. Examples of usable polyurethane resins are listed hereinafter.

Examples of polyurethane resins are described in U.S. Pat. Nos. 3,297,745; 3,700,634 or DE-OS 37 22 005. They are urethane acrylate polymers obtained by reacting polyisocyanates with hydroxy-functionalised acrylates or graft polymers of acrylic monomers on polyurethane dispersions.

Other polyurethane dispersions are described in DE-OS 39 36 794, EP-A-0 297 576 and DE-OS 32 10 051. These substances are binders consisting of polyurethane polyureas. These binders can be converted into a dispersion phase.

Other polyurethane resins described in DE-OS 40 00 889 are reaction products based on diisocyanates with polyhydroxyl alkanoic acids and polyester polyols.

Other polyurethane dispersions are described in EP-A 0 089 497, U.S. Pat. No. 4,147,679 or DE-OS 24 46 440. The starting compound may also be e.g. a polyester or polyether. These substances are aqueous polyurethane dispersions which can be produced with compounds containing incorporated neutralisable groups.

The resins can be straight-chain, branched or optionally partly crosslinked. The polyurethanes can be manufactured in various ways. The properties can be varied by using different starting compounds. For example the elasticity, viscosity, gloss or wetting capacity can be influenced via the choice of raw materials. Polyurethane resins form stable aqueous dispersions, either after neutralisation or together with emulsifiers.

The molecular weight of the polyurethane resins (PU binders) can e.g. be 500 to 500 000. Preferably the molecular weight is about 1500 to 200 000. It is preferred to use neutralised PU binders which are not crosslinked and contain carboxyl groups.

The emulsifiers for the epoxy resins and polyurethane resins used according to the invention can be normal ionic or non-ionic emulsifiers in the lacquer sector, e.g. alkyl sulphonates.

The coating agents according to the invention can be formulated as a 1K system or a 2K system. In the form of a 2K system, the coating agent consists of two different components, one containing the epoxy resin and the other the crosslinking agent. Before the 2K system is applied, the individual components are mixed in the desired proportion to form the coating agent ready for application. The polyurethane resin can be present in the epoxy resin component or the crosslinking component or in both. Care must be taken that the mixture is compatible and gives dispersions which are stable in storage. The component containing the polyurethane resin is aqueous, whereas the second component can likewise be an aqueous dispersion or can be in concentrated form for dilution in water. In the latter case this component together with the other aqueous component is converted into the water phase when the coating agent is manufactured. Preferably both components are diluted with water.

The two components are usually mixed so that the ratio of reactive H atoms in the amino groups relative to the epoxy groups is 0.7:1 to 1.5:1, preferably 0.9:1 to 1.3:1.

The polyurethane resin can be mixed with the film-forming resins in dispersed form, or the polyurethane resin is mixed e.g. with the activator or the epoxy resin and then converted together into the aqueous phase. One preferred embodiment is use of an anionic polyurethane dispersion stabilised by incorporated carboxyl groups which have been neutralised with amine. The solid content is e.g. 30 to 70 wt. %. The neutralising agent can e.g. be a volatile amine. It is preferred to use a polyurethane resin neutralised via the amino group of the activator. This reduces the amount of volatile components which have to evaporate during formation of the film.

The coating agents according to the invention can also contain conventional pigments and fillers, e.g. titanium dioxide, barium sulphate, aluminium silicate, magnesium silicate, silicon dioxide, zinc phosphate, carbon black, colouring and/or transparent organic or inorganic pigments, finely divided metal powder, more particularly aluminium powder, or interference pigments. The fillers may also be crosslinked organic polymer microparticles resistant to solvents.

The pigments can be dispersed either in the epoxy resin component or in the activator component. Stable pigment/binder dispersions are produced during dispersion or grinding. No chemical reaction should occur between the pigments and binder constituents. Alternatively the pigments can be dispersed in small quantities of a conventional paste or wetting resin and the mixture can then be converted into the water phase together with a film-forming binder.

The viscosity of the pigmented component must be adjusted so as to prevent sedimentation or phase separation even after prolonged storage. Preferably the pigments are dispersed in the form of an aqueous paste, or the pigments can be present in the crosslinking component.

A less suitable embodiment is obtained if the aqueous pigment preparation is added as a third component during the manufacture of a 2K coating agent ready for application. This procedure may be used e.g. if there are problems of stability in storage.

The coating agent, or one or both components of a 2K system, can contain conventional lacquer adjuvants, e.g. anti-cratering agents, anti-foaming agents, catalysts, levelling agents, primers or small proportions of organic solvents. These adjuvants are for obtaining various properties of importance during processing or storage or application. The additives must not adversely influence the properties of the crosslinked lacquer film, e.g. the resistance to corrosion or the strength of adhesion.

The polyamine component and the epoxy resin component of a 2K system have a solid content of 30-95 wt. % each; the solvent is mainly water. The proportion of organic volatile constituents, e.g. organic solvents, in the combined coating agent should be below 10 wt. %. The pigment content, relative to the total binder content, is between 0 and 150 wt. %. The proportion of polyurethane resin is 5-80 wt. %, preferably 15-70 wt. % relative to the total weight of solids in the epoxy resin and polyamine.

During manufacture of the coating agent according to the invention, the components A and B are mixed in a suitable apparatus. Usually it is advantageous for the two components to have comparable viscosity. After short, thorough homogenisation, e.g. by simple agitation or with a rotor-stator mixer and optional addition of more water to obtain a suitable viscosity for processing, the coating agent is ready for application. It can be applied in various ways, e.g. by immersion, rolling, painting or spraying. The processing time depends on the reactivity of the components. It can be between 30 minutes and 24 hours. The crosslinking reaction can optionally be accelerated by a catalyst. After application, the process and the chemical reaction can be further accelerated by increasing the temperature. The limits are e.g. at 20° to 120° C., preferably below 80° C.

The coating agent according to the invention can be used on various substrates, e.g. metal parts, plastics parts, wood, glass, lacquered metal parts, semi-metal parts, or mineral under-surfaces. The preferable use is for coating metal and/or plastics parts for the car and commercial-vehicle industry. The plastics substrates can e.g. be polyurethanes, polyesters, polyamides or polyolefins. Even temperature-sensitive substrates can be coated if the crosslinking temperature is adjusted.

After crosslinking, the substrates are uniformly coated with a smooth fault-free surface. The adhesion to the substrate is good. The resulting lacquered articles can optionally be given additional coats of lacquer, e.g. clear lacquer coatings, coloured coatings, base surface-lacquer coatings or anti-gravel coatings. The resulting coated articles have a wide range of uses. They are particularly suitable for producing homogeneous, resilient, firmly adhesive base primers on metal and plastics substrates in the motor vehicle industry. They can be used for standard lacquering or repairing the lacquer on motor vehicles. The base layers can subsequently be processed by conventional methods to obtain multi-layer lacquers. Particularly advantageously, the coating agents making up the multi-layer lacquer can be aqueous or of conventional construction, without problems of compatibility with the aqueous primer.

DETAILED DESCRIPTION OF THE PREFERRED EMBODIMENTS

Example of manufacture 1

Manufacture of a polyurethane resin as per Example 1 in DE-OS 40 00 889:

1687 g of a straight-chain saturated polyester (made up of adipic acid, neopentyl glycol and hexanediol-1,6 in the molar ratio 1:1) with an acid number below 1, an OH number of 130 and a viscosity of 275 mPa.s (measured in 80% solution in acetone at 25° C.) were thoroughly agitated while mixing with 182.5 g dimethylol propionic acid and 525 g dry acetone in a reaction vessel with an internal thermometer and reflux condenser. After adding 803 g dicyclohexyl methane diisocyanate, the mixture was slowly heated to 70° C. This reaction temperature was maintained until the NCO content was below 0.2%. After cooling to 60° C., 875 g of butoxyethanol was added and the acetone was then distilled, optionally in vacuo.

| Solids (30 minutes at 150° C.): | 75 wt. % |
|---|---|
| Acid number (relative to solid resin): | 29 |
| Viscosity at 25° C.: | About 7 Pa.s |
| (After dilution to 60 wt. % with butoxyethanol) | |

Example of manufacture 2

Manufacture of an aqueous polyurethane dispersion as per DE-OS 36 28 124, Example of manufacture 2.

In a reaction vessel with agitator, internal thermometer, heating and reflux condenser, 250 g of a straight-chain polyester (made up of adipic acid, isophthalic acid and hexanediol; OH number 77, acid number 10) was heated with 80 g methyl ethyl ketone and 53.3 g N-methyl pyrrolidone to 70° C. and 74 g of hydrogenated bisphenol A and 28.3 g of dimethylol propionic acid was added at the same temperature. The batch was heated to 120° C. and agitated at this temperature for half an hour. 146.7 g hexamethylene diisocyanate was then added at 70° C. After an exothermic phase (temperature <90° C.) the batch was kept at 75° C. until the residual isocyanate values were lower than 1.8. The hot resin mixture was dispersed in 891 g deionised water and 23.5 g triethylamine with vigorous agitation. Five minutes after the resin had been added, 10.5 g propylene diamine-1,3 in 75 g deionised water was added and the batch was agitated for a further hour.

The result was a translucent aqueous dispersion having the following characteristics:

| Solids: | 33% |
|---|---|
| Viscosity (20° C.): | 109 mPa.s |
| pH: | 9.8 |
| Acid number: | 27 (mg KOH per g solid resin) |
| Mn: | About 120 000 |

Example of manufacture 3

Pigment paste 1:

300 g of an aliphatic polyamine (H-equivalent weight 185, viscosity 12 530 maps; ®Beckopox special activator EH 623) was agitated at 35° C. to 40° C. with 100 g dipropylene glycol dimethyl ether, 1500 g demineralised water, 25 g wetting agent, 1500 g titanium dioxide, 250 g talc and 25 g carbon black in a high-speed dissolver for 15 minutes and then ground in a pearl mill at 35° to 40° C.

200 g of the aliphatic polyamine was then added with agitation.

Pigment paste 2:

A polyurethane dispersion was prepared from 2200 g polyurethane resin solution from the example of manufacture 1, 57 g dimethyl ethanolamine and 2743 g demineralised water.

620 g of the polyurethane dispersion, 3 g dimethyl ethanolamine, 147 g butoxyethanol, 15 g wetting agent, 0.2 g anti-foaming agent, 325 g demineralised water and 1890 g titanium dioxide were mixed in a high-speed dissolver. The pigment-paste mixture was ground in a pearl mill at 35 to 40° C.

Example of manufacture 4

Manufacture of an epoxy resin as per DE-A-38 20 301, Example III.7:

a) 309 g of industrial polyethylene glycol with an average molecular weight of 4000 and 32.5 g of a polyglycidyl ether based on bisphenol A and having an epoxide equivalent weight of 185 were heated together to 100° C. and, with agitation, mixed with 0.5 ml $HBF_4$, 50% in $H_2O$, diluted with 10 ml methyl isobutyl ketone. The OH/epoxide equivalent ratio was 1:1.15, and the epoxide equivalent weight of the condensate was about 350 000. The methyl isobutyl ketone was removed in vacuo.

b) 259 g of the condensate which was obtained in a) and which, when 50 wt. % dissolved in benzyl alcohol, had a viscosity of 5530 mPa.s (25° C.), was mixed at 130° C. with 0.5 ml of a 1% solution of dibutyl tin dilaurate in xylene and then with 1.30 g of trimethyl hexamethylene diisocyanate (2,2,4-,2,4,4-isomer mixture), dissolved in 15 ml dried xylene, for 30 minutes. The xylene was removed in vacuo at 130° C. after a holding time of 60 minutes. The condensate, when 50 wt. % dissolved in benzyl alcohol, had a viscosity of 7160 mPa.s (25° C.).

c) In a 2-liter three-necked flask, equipped with thermometer, blade agitator, reflux condenser and dropping funnel, 325 g of an epoxy resin based on bisphenol A and having an epoxide equivalent of 183 was reacted with 120 g bisphenol A and 27 g of the dispersing agent obtained in b) and dissolved in 27 g benzyl alcohol, in the presence of 700 mg triphenyl phosphine at 150° to 170° C. until the epoxide equivalent weight was 520–540. The mixture was diluted and cooled with 60 g methoxy propanol. 85 g of deionised water was added uniformly over a period of 5–30 minutes at an agitation speed of about 800 rpm and lowering the temperature to 70°–60° C., resulting in an aqueous dispersion which was subsequently further diluted with about 215 g of deionised water. The dispersion had a solid content of 54.0 wt. %, a viscosity of 4700 mPa.s (Brookfield, spindle 3 at 6 rpm) and a particle size of 0.42 μm.

Example 1

300 g of an aqueous dispersion containing 159 g of the bisphenol A-epoxy resin (epoxide equivalent weight 530) obtained in example of manufacture 4c) and 21 g methoxy propanol was mixed with 250 g of an aqueous dispersion as per example of manufacture 2. A crosslinking component was added to the mixture, i.e. 54 g of an aliphatic polyamine (H-equivalent weight 185, viscosity 2800 mPa.s; ®Beckopox special accelerator VEH 2671), and mixed with thorough agitation.

The aqueous coating agent composition was applied to a variegated polypropylene (Hostalen ® PPR 8008 made by Hoechst AG) in a wet film 35 μm thick.

When dried at room temperature, the film was smooth and firmly adhesive.

Example 2

A coating composition was manufactured as in Example 1, but using 23 g polyamine instead of 18 g.

Smooth, firmly adhesive films were formed after application with a doctor blade to variegated polypropylene as described in Example 1 and to a steel sheet.

Example 3

A pigmented coating composition was prepared from 100 g of an aqueous bisphenol A dispersion as described in Example 1 and a mixture of 90 g of a polyurethane dispersion as per example of manufacture 2, 180 g pigment paste 1 and 7 g modified aliphatic polyamine as per Example 1.

The coating composition was applied with a doctor blade to variegated polypropylene (Hostalen® PPR 8008) in a wet film 35 μm thick and, after seven days storage at room temperature, was tested for resistance to damp rooms. The lacquer film showed no adverse effect after 240 hours.

Another test was carried out on the following lacquer structure:

a) Primer as described hereinbefore
b) Diamantsilber 65 120 commercial water-based lacquer, dry film 15 μm (Herberts GmbH)
c) 2K-PUR clear lacquer 47 871 dry film 35 μm (Herberts GmbH)

The primer a) and the lacquers b) and c) were adjusted to the viscosity for spraying and sprayed in succession. The clear lacquer c) was applied after application of the water-based lacquer b) and after exhausting the air for 15 minutes. The entire lacquer structure was then stoved at 80° C. for 30 minutes.

The test for resistance to damp rooms (DIN 50017, water-of-condensation test climate) and elasticity in the penetration test (DIN 53443 Part 2) gave good results.

(PUR=polyurethane)

Comparative example

The coating composition was prepared as in Example 3 but without a polyurethane dispersion. The applied film had a surface with many pin holes and became brittle after seven days storage, so that there was no point in further testing.

Example 4

A pigmented coating composition was prepared from 100 g of an aqueous bisphenol A dispersion as described in Example 1 and 137 g of pigment paste 2 together with 21 g of the modified aliphatic polyamine from Example 1.

After the viscosity had been suitably adjusted with water, a 50 μm wet film was sprayed on to a steel sheet. The sheet was heated to 70° C., forming a smooth, firmly adhesive, tough and elastic film of lacquer.

Example of manufacture 5

Manufacture of an epoxy resin as per DE-OS 36 43 751, Example II.1 a) 150 g of industrial polyethylene glycol with an average molecular weight (Mw) of 3000 and 18.5 g of a polyglycidyl ether based on bisphenol A with an epoxide equivalent weight of 185 were heated together to 100° C. and mixed with agitation with 0.9 g $BF_3$ etherate, diluted to 5 wt. 1% with dioxane. The OH/epoxide equivalent ratio was 1:1 and the epoxide equivalent weight was about 360 000.

b) In a 2-liter three-necked flask, equipped with thermometer, blade agitator, reflux condenser and dropping funnel, 325 g of an epoxy resin based on bisphenol A with an epoxide equivalent of 183 was reacted with 98 g bisphenol A and 27 g of a dispersing agent, i.e. the condensate obtained in a), in the presence of 750 mg triphenyl phosphine at 150° to 160° C. until the epoxide equivalent was 530. The mixture was diluted and cooled with 27 g benzyl alcohol and 60 g methoxy propanol. When the temperature was below 100° C., 105 g of deionised water were added at a uniform rate for a period of 5–30 minutes and at an agitation speed of about 800 rpm, the temperature being lowered to 70°–60° C. The result was an aqueous dispersion which was subsequently further diluted with 173 g deionised water. The dispersion had a solid content of 55.7 wt. %, a viscosity of 11 700 mPa.s (Brookfield, spindle 3 at 6 rpm) and a particle size of 0.66 μm.

Example 5

128 g of an epoxy resin as per example of manufacture 5 (epoxide equivalent 530) without added water was mixed with 25 g talc and 25 g titanium dioxide and ground. A mixture of 24 g of an aliphatic polyamine (H-equivalent 160), 42 g polyurethane resin as per example of manufacture 1 and 60 g water was added. The coating agent was somewhat diluted with water, applied to a sheet-metal panel to a thickness of about 70 μm and dried at 50° C. The result was a firmly-adhering film with fault-free surface. The surface could be ground and covered with lacquer.

Example of manufacture 6

Manufacture of an epoxy resin as per DE-OS 38 20 301, Example III.3.

a) 309 g of industrial polyethylene glycol with an average molecular weight of 4000 and 32.5 g of a polyglycidyl ether based on bisphenol A and with an epoxide equivalent weight of 185 were heated together to 100° C. and, with agitation, mixed with 0.5 ml $HBF_4$, 50% in $H_2O$ diluted with 10 ml methyl isobutyl ketone. The OH/epoxide equivalent ratio was 1:1.5 and the epoxide equivalent weight of the condensate was about 350 000. The methyl isobutyl ketone was removed in vacuo.

280 g of the resulting condensate which, when 50 wt. % dissolved in benzyl alcohol, had a viscosity of 5530 mPa.s (25° C.), was mixed at 130° C. and in 30 minutes with 0.7 g toluylene diisocyanate (TDI 80=80% 2,4-, 20% 2,6-isomer dissolved in 10 ml dried xylene). The xylene was removed in vacuo after a holding time of 60 minutes at 130° C. The condensate, when 50 wt. % dissolved in benzyl alcohol, had a viscosity of 9000 mPa.s (25° C.).

b) In a 2-liter three-necked flask equipped with thermometer, blade agitator, reflux condenser and dropping funnel, 325 g of an epoxy resin based on bisphenol A and with an epoxide equivalent weight of 183 was reacted with 120 g of bisphenol A and 27 g of a dispersing agent in the form of the condensate obtained in a), dissolved in 27 ml benzyl alcohol, in the presence of 700 mg triphenyl phosphine at 150°–170° C. until the epoxide equivalent weight was 530. The mixture was diluted and cooled with 60 g methoxy propanol. 85 g deionized water was added at a uniform rate in 5–30 minutes at an agitation speed of about 800 rpm and lowering the temperature to 70°–60° C. The result was an aqueous dispersion which was subsequently further diluted with about 215 g of deionised water. The dispersion had a solid content of 54.2 wt. %, a viscosity of 4900 mPa.s (Brookfield, spindle 3 at 6 rpm) and a particle size of 0.46 μm.

Example 6

375 g of pigment paste 2 was vigorously agitated with 85 g of a commercial non-ionic polyurethane dispersion (40% solids, DSM ZB 2081 UZ) and 63 g demineralised water, followed by addition of 54 g of an aliphatic polyamine (H-equivalent 185, viscosity 2800 mPa.s, ®Beckopox special accelerator VEH 2671) with agitation.

Next, 300 g of an aqueous dispersion containing 159 g of the modified bisphenol A epoxy resin (epoxide equivalent weight 530) as per example of manufacture 6 and 21 g methoxy propanol, was added and vigorously mixed by agitation.

The aqueous coating composition was applied to a variegated polypropylene (Hostalen ® PPR 8008 by Hoechst AG) in a wet film 35 µm thick.

The test was made on the following lacquer structure:
a) Primer as described hereinbefore
b) Diamantsilber 65 120 commercial water-based lacquer, dry film 15 µm (Herberts GmbH)
c) 2K-PUR clear lacquer 47 891 dry film 35 µm (Herberts GmbH)

The primer a) and the lacquers b) and c) were adjusted to the viscosity for spraying and sprayed in succession. The clear lacquer c) was applied after application of the water-based lacquer b) and after exhausting the air for 15 minutes. The entire lacquer structure was then dried at 80° C. for 45 minutes.

The test for resistance to damp rooms (water-of-condensation test climate, DIN 50017) and elasticity in the penetration test (DIN 53443, Part 2) gave very good results.

We claim:

1. An aqueous coating agent, comprising
one or more film-forming water-dilutable or water-soluble epoxy resins with an epoxide equivalent weight of 100 to 10000,
one or more water-dilutable or water-soluble polyamines with at least two primary and/or secondary amino groups in the molecule and an equivalent weight of 50 to 500, and
optional pigments, fillers and/or other conventional lacquer adjuvants,
the ratio of reactive H atoms in the polyamines to the epoxy groups in the epoxy resins being 0.7:1 to 1.5:1 characterized in that it contains
5 to 80 wt. % of one or more water-dilutable or water-soluble polyurethane resins which contain substantially no reactive groups used for cross-linking with a number average molecular weight (Mn) of 500 to 500000 relative to the sum of the weights of the solids in the epoxy resin and polyamine.

2. An aqueous coating agent according to claim 1, characterized in that it is a two-component system in which the epoxy resin component and the polyamine component are present separately and the polyurethane resin is present together with the epoxy resin component and/or the polyamine component.

3. An aqueous coating agent according to claim 2, characterised in that the polyurethane resin is present together with the polyamine component.

4. An aqueous coating agent according to claim 1, characterized in that the polyurethane resin is present in the form of an aqueous dispersion in which it is stabilized by anionic groups introduced by a reaction, or non-ionic hydrophilic groups or by addition of an emulsifier.

5. An aqueous coating agent according to claim 4, characterized in that the anionic groups are acid groups which are neutralised by using the polyamine in the polyamine component.

6. An aqueous coating agent according to claim 1, characterized in that the polyamine is aliphatic and the epoxy resin is aromatic.

7. An aqueous coating agent according to claim 6, characterized in that the epoxy resin is in the form of an aqueous dispersion.

8. An aqueous coating agent according to claim 1, characterized in that the pigments are dispersed in a paste resin.

9. An aqueous coating agent according to claim 1, characterized in that the pigments are in the polyamine component.

10. A method of using coating agents according to any of claims 1 to 9 for producing a coating on a substrate.

11. A method according to claim 10, for producing coatings on plastics substrates.

12. A method according to claim 10 for repairing lacquer on motor vehicles.

13. A method for using a coating agent according to any of claims 1 to 9 for producing multilayer lacquering on a substrate.

14. A substrate coated with a coating agent according to any of claims 1 to 9.

* * * * *